United States Patent
Lin et al.

(10) Patent No.: US 7,396,134 B2
(45) Date of Patent: Jul. 8, 2008

(54) APPARATUS AND METHOD FOR DRIVING LIGHT SOURCE OF PROJECTOR

(75) Inventors: Chia-Jin Lin, Chiayi County (TW); Chia-Lin Liu, Taichung County (TW); Chi-Neng Mo, Taoyuan County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 311 days.

(21) Appl. No.: 11/160,981

(22) Filed: Jul. 19, 2005

(65) Prior Publication Data

US 2007/0019169 A1 Jan. 25, 2007

(51) Int. Cl.
*G03B 21/14* (2006.01)
*G02F 1/13357* (2006.01)

(52) U.S. Cl. ............................. 353/85; 353/122; 349/61
(58) Field of Classification Search .................... 353/85, 353/121, 122, 69; 349/61; 348/798, 800
See application file for complete search history.

(56) References Cited

U.S. PATENT DOCUMENTS 5,331,253 A * 7/1994 Counts .................... 315/209 R
5,854,662 A * 12/1998 Yuyama et al. ............. 348/790
2003/0184506 A1 10/2003 Janssen et al. ................ 345/87
2006/0126021 A1 * 6/2006 Vanlier et al. ................. 353/31
2006/0139578 A1 * 6/2006 Nakagawa et al. ............ 353/85

* cited by examiner

*Primary Examiner*—Andrew T Sever
(74) *Attorney, Agent, or Firm*—Jianq Chyun IP Office

(57) ABSTRACT

An apparatus and a method for driving the light source of a projector are provided. The apparatus includes an adjustment unit, a lamp driver, a phase lock loop (PLL) and a mercury lamp. The adjustment unit provides an enabling signal and regulates the frequency of the enabling signal according to an indication signal. The lamp driver provides a driving signal according to the enabling signal and an input voltage, wherein the frequency of the driving signal is varied with the frequency of the enabling signal. The PLL provides a synchronized driving signal according to the driving signal and a vertical synchronization signal, wherein the synchronized driving signal is phase-synchronous with the frame field of the projector. The mercury lamp serves as the light source of the projector according to the synchronized driving signal.

16 Claims, 3 Drawing Sheets

APPARATUS AND METHOD FOR DRIVING LIGHT SOURCE OF PROJECTOR

BACKGROUND OF THE INVENTION

1. Field of Invention

The present invention relates to an apparatus and a method for driving the light source of a projector, and particularly to an apparatus and a method for driving the light source of a projector capable of avoiding flicker.

2. Description of the Related Art

Currently, a projector is equipped with a mercury lamp as the light source thereof. FIG. 1 is a schematic block diagram showing a conventional apparatus for driving a mercury lamp. The driving apparatus includes a lamp driver 101 and a mercury lamp 102. The driving mode of the mercury lamp 102 can be seen in FIG. 2. The lamp driver 101 receives an input voltage 111 and an enabling signal 112, then produces an alternative driving signal 113 for driving the mercury lamp 102. If the frequency of the driving signal 113 does not match the frame rate of a projector, or there is no phase-synchronization between them but with matched frequencies, a flicker displaying occurs.

A frequency match means the frequency of a driving signal 113 is the same as the frame rate, or the frame rate is an integer multiple of the frequency of a driving signal 113. A phase-synchronization means every pulse of a driving signal 113 locates always between two adjacent frame fields. FIG. 3 shows that the frequency of a driving signal 113 matches the frame rate, but with a phase discord, wherein 301-305 are five consecutive frame fields.

SUMMARY OF THE INVENTION

An object of the present invention is to provide an apparatus for driving the light source of a projector, wherein a driving signal of a mercury lamp is frequency-matched and phase-synchronized with the frame rate to solve the conventional flicker problem.

Another object of the present invention is to provide a method for driving the light source of a projector, wherein a driving signal of a mercury lamp is frequency-matched and phase-synchronized with the frame rate to solve the conventional flicker problem.

To achieve the above-mentioned or other objects, the present invention provides an apparatus for driving the light source of a projector, comprising an adjustment unit, a lamp driver, a phase lock loop (PLL) and a mercury lamp. The adjustment unit provides an enabling signal with a regulated frequency in response to an indication signal. The lamp driver provides a driving signal according to the enabling signal and an input voltage, wherein the driving signal frequency is varied with the enabling signal frequency. The PLL provides a synchronized driving signal in response to the driving signal and a vertical synchronization signal, wherein the synchronized driving signal has a same phase as the one of frame fields of the projector. The mercury lamp serves as a light source of the projector.

In an embodiment, the adjustment unit of the above-described apparatus for driving the light source of a projector further includes a memory and a controller. The memory is used for storing a formula related to the enabling signal frequency and the driving signal frequency. The controller regulates the enabling signal frequency according to the above-mentioned formula and an indication signal.

In an embodiment, the above-described apparatus for driving the light source of a projector further includes a feedback unit, which provides an indication signal according to that whether the driving frequency of the mercury lamp is matched with the frame rate of the projector or not. Then, in response to the indication signal and the vertical synchronization signal, the adjustment unit provides an enabling signal for matching the frequency of the synchronized driving signal with the frame rate of the projector.

In the above-described apparatus for driving the light source of a projector of an embodiment, the feedback unit further includes a light sensor and an analog-to-digital converter (ADC). The light sensor provides an analog indication signal according to that whether the driving frequency of the mercury lamp is matched with the frame rate of the projector or not. The ADC converts the analog indication signal into an indication signal.

The present invention also provides a method for driving the light source of a projector, including the following steps. First, an enabling signal is provided, and the enabling signal frequency is regulated according to an indication signal. Then, a driving signal with a frequency varied with the enabling signal frequency is provided in response to the enabling signal and an input voltage. Further, a synchronized driving signal with a phase synchronized with the frame field phase of the projector is provided in response to the driving signal and a vertical synchronization signal. Finally, a mercury lamp is driven by the above-mentioned synchronized driving signal.

For the adjustment unit to provide a proper enabling signal, the present invention employs a feedback control mechanism of the feedback unit or a manually provided indication signal. In this way, the frequency of the synchronized driving signal is matched with the frame rate of a projector. In addition, the present invention employs a phase lock loop (PLL) for synchronizing the phase of the synchronized driving signal with the frame fields. Through the above-described efforts, the present invention is able to solve the conventional flicker problem.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

The major scheme of the present invention is that the frequency of a driving signal output from a lamp driver is varied with the frequency of an enabling signal received by the lamp driver, and by regulating the enabling signal frequency, the driving signal frequency is accordingly matched with the frame rate. Further, by using a phase lock loop (PLL), the driving signal is also phase-synchronous with the frame fields of a projector. Thus, the present invention is able to solve the conventional flicker problem.

Figure 1:
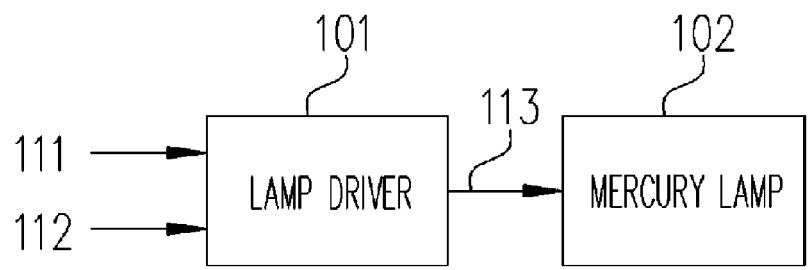
FIG. 1 is a schematic block diagram showing a conventional apparatus for driving a mercury lamp.
Figure 2:
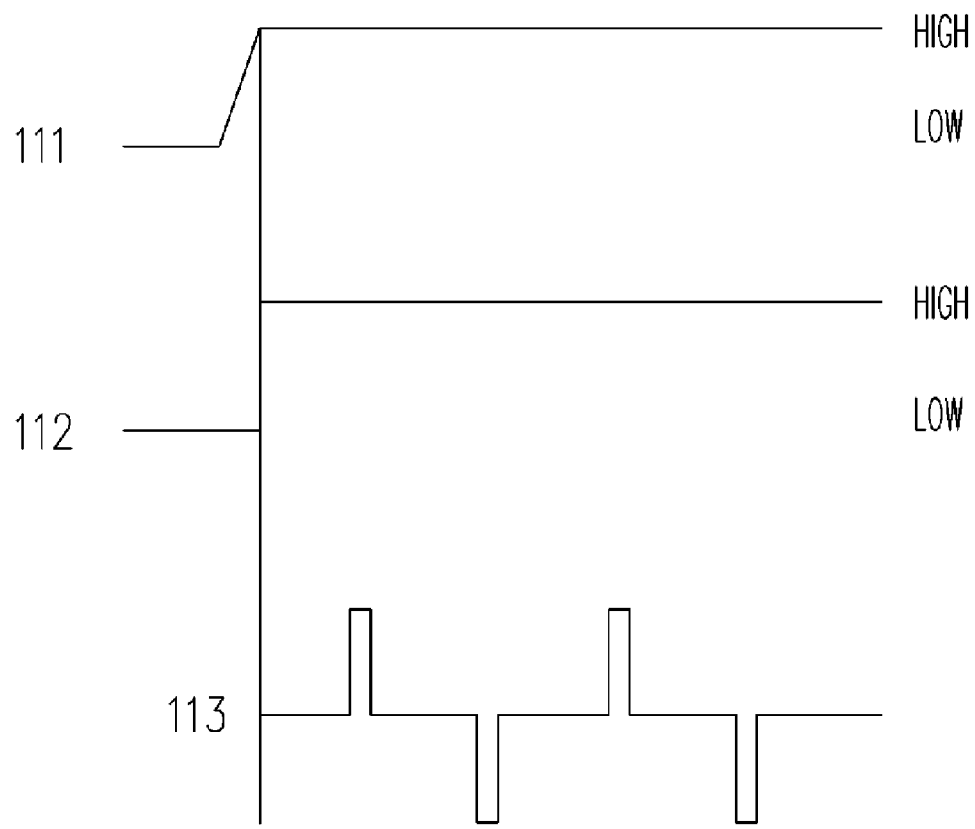
FIG. 2 illustrates a driving signal chart of a conventional mercury lamp.
Figure 3:
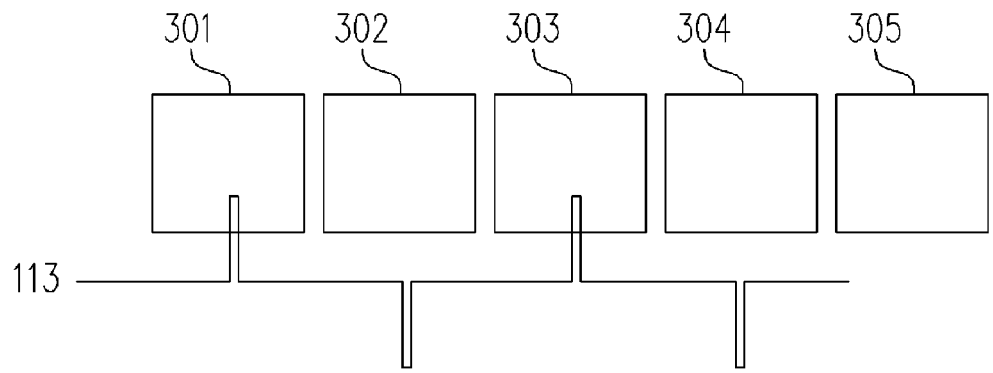
FIG. 3 illustrates a driving signal chart of a conventional mercury lamp along with the frame fields to show a relationship between the driving signal frequency and the frame rate.
Figure 4:
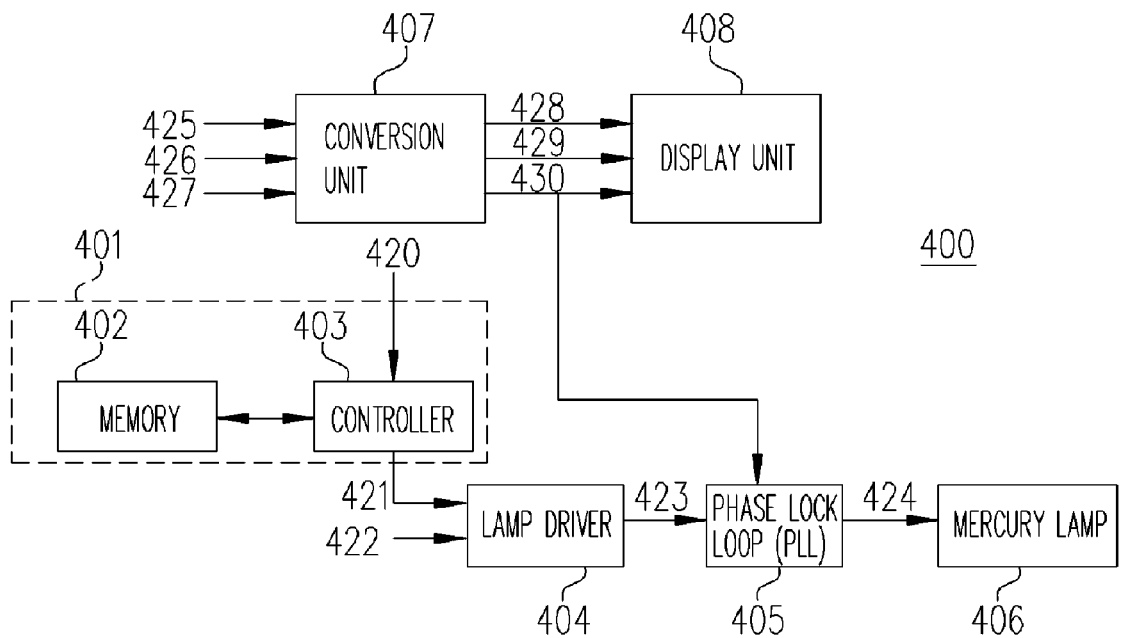
FIG. 4 is a block diagram of an apparatus for driving the light source of a projector according to an embodiment of the present invention.

Referring to FIG. 4, it is a block diagram of an apparatus for driving the light source of a projector 400 according to the first embodiment of the present invention. The driving apparatus 400 includes a conversion unit 407, a display unit 408, an adjustment unit 401, a lamp driver 404, a phase lock loop (PLL) 405 and a mercury lamp 406.

Figure 5:
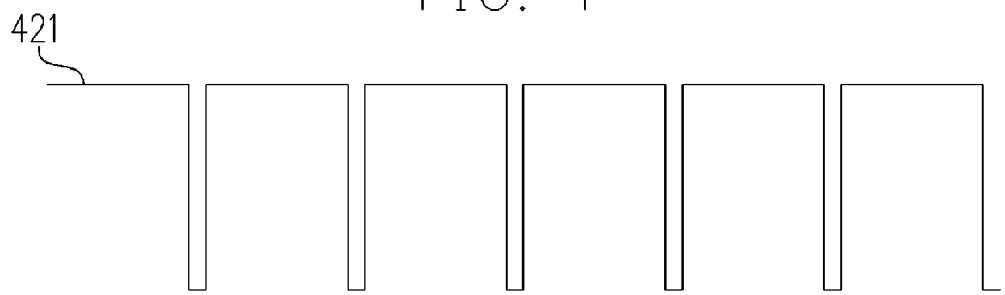
FIG. 5 illustrates an enabling signal of an apparatus for driving the light source of a projector according to an embodiment of the present invention.

The adjustment unit serves for providing an enabling signal 421 and regulating the frequency of the enabling signal 421 according to an indication signal 420. The adjustment unit 401 in the embodiment further includes a memory 402 and a controller 403. Wherein, the memory 402 is used for storing a formula related to the frequency of the enabling signal 421 and the frequency of the driving signal 423. The controller 403 regulates the frequency of the enabling signal 421 according to the above-mentioned formula and the indication signal 420. In the embodiment, the enabling signal 421 is a square wave signal, shown as in FIG. 5. A user of the projector initiates the indication signal 420. When a user has a flicker perception, the user can manually provide an indication signal 420, by which the frequency of the enabling signal 421 at first and further the frequency of the driving signal 423 and the frequency of a synchronized driving signal 424 are accordingly regulated.

The lamp driver 404 provides the driving signal 423 according to the enabling signal 421 and an input voltage 422, wherein the frequency of the driving signal 423 is varied with the frequency of the enabling signal 421. The PLL 405 provides a synchronized driving signal 424 in response to the driving signal 423 and a vertical synchronization signal 430, wherein the synchronized driving signal 424 has a same phase as the one of frame fields of the projector. The mercury lamp 406 serves as a light source of the projector according to the synchronized driving signal 424.

In addition to the above-mentioned components, the apparatus for driving the light source of a projector 400 further includes a conversion unit 407 and a display unit 408. The conversion unit 407 serves for receiving an original image signal 425, an original horizontal synchronization signal 426 and an original vertical synchronization signal 427, converting the resolution and the frame rate of images to be displayed, and providing a converted image signal 428, a converted horizontal synchronization signal 429 and a converted vertical synchronization signal 430. Wherein, the vertical synchronization signal 430 is one of input signals received by the PLL 405. The display unit 408 serves for displaying the image signal 428 according to the horizontal synchronization signal 429 and the vertical synchronization signal 430.

It can be summarized from the above-described that the driving apparatus 400 in FIG. 4 provides the adjustment unit 401 with a proper enabling signal 421 according to an indication signal 420 initiated by a user, which makes the frequency of the synchronized driving signal 424 matched with the projector frame rate. Consequently, the conventional flicker problem is solved by the present invention.

Figure 6:
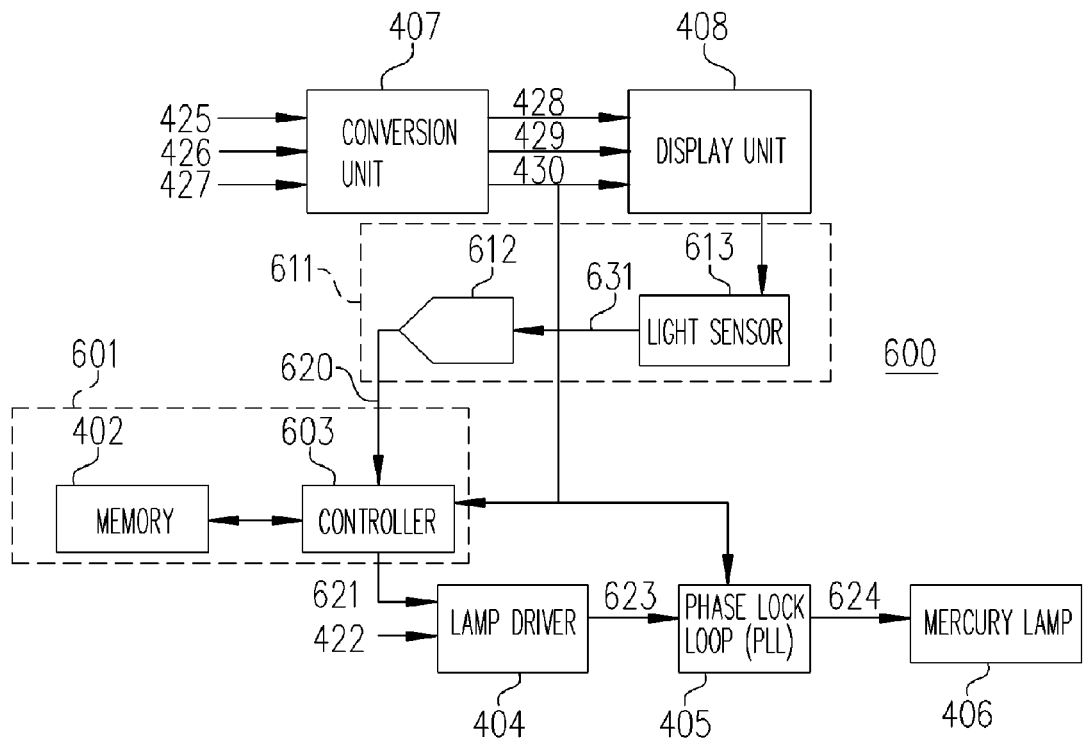
FIG. 6 is a block diagram of an apparatus for driving the light source of a projector according to another embodiment of the present invention.

In addition to the manual mode by a user, a feedback control is used for automatically regulating the driving frequency of the mercury lamp. Referring to FIG. 6, it is a block diagram of an apparatus for driving the light source of a projector 600 according to the second embodiment of the present invention. Distinguished from the driving apparatus 400, in the driving apparatus 600 a feedback unit 611 is added, and a vertical synchronization signal 430 is added as one of input signals to the controller 603. The rest components in the driving apparatus 600 remain the same as the ones in the driving apparatus 400.

The feedback unit 611 provides an indication signal 620 according to that whether the driving frequency of the mercury lamp 406 is matched with the frame rate of the projector or not. In response to the indication signal 620 and the vertical synchronization signal 430, the controller 603 in the adjustment unit 601 provides an enabling signal 621 for matching the frequency of the synchronized driving signal 624 with the frame rate of the projector.

In the second embodiment, the feedback unit 611 further includes a light sensor 613 and an analog-to-digital converter (ADC) 612. The light sensor 613 senses display frames of the displaying unit 408, then provides an analog indication signal 631 according to that whether the driving frequency of the mercury lamp 406 is matched with the frame rate of the projector or not. Further, the ADC 612 converts the analog indication signal 631 into an indication signal 620 to achieve a feedback control goal.

It can be seen from the above described that the driving apparatus 600 in FIG. 6 uses a feedback mechanism function of the feedback unit 611 for the adjustment unit 601 to provide a proper enabling signal 621, which makes the frequency of the synchronized driving signal 624 matched with the frame rate of the projector. In addition, the PLL 405 is used for synchronizing the phase of the synchronized driving signal 624 with the frame fields. In this way, the conventional flicker problem is solved.

Figure 7:
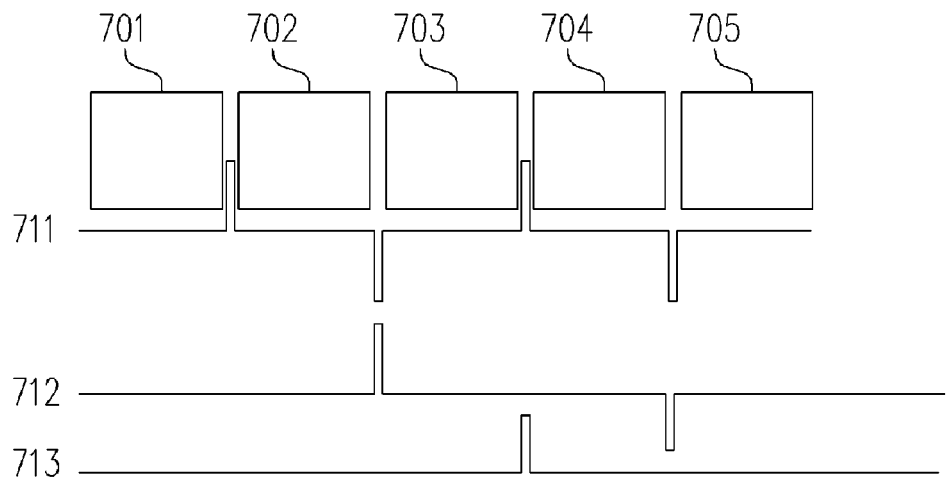
FIG. 7 illustrates a synchronized driving signal chart of an apparatus for driving the light source of a projector according to another embodiment of the present invention along with the frame fields of the projector.

In the above-described two embodiments, to achieve the frequency match, the synchronized driving signal can have a same frequency as the frame rate of the projector, shown as the synchronized driving signal 711 in FIG. 7, wherein 701-705 denote the frame fields of the projector. Besides, the frame rate of the projector can be an integer multiple of the frequency of the synchronized driving signal, shown as the synchronized driving signals 712 and 713 in FIG. 7. Wherein the frequency of the signal 712 is a half of the frame rate and the frequency of the signal 713 is one third of the frame rate.

In addition to the apparatuses for driving the light source of a projector in two above-described embodiments, the present invention also provides a method for driving the light source of a projector. All details of the method are included in the descriptions of the above-described embodiments for the driving apparatus hereinabove. Anyone skilled in the art, after reviewing the above described, is capable of implementing the method without any difficulty. Therefore, the details of the driving method are omitted to describe for simplicity.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. An apparatus for driving the light source of a projector, comprising:

an adjustment unit, providing an enabling signal and regulating the frequency of the enabling signal by an indication signal;

a lamp driver used for providing a driving signal by the enabling signal and an input voltage, wherein the frequency of the driving signal is altered with the frequency of the enabling signal;

a phase lock loop (PLL) used for providing a synchronized driving signal by the driving signal and a vertical synchronization signal, wherein the synchronized driving signal is phase-synchronous with the field of the projector; and a mercury lamp serving as the light source of the projector by the synchronized driving signal.

2. The apparatus for driving the light source of a projector as recited in claim 1, wherein the enabling signal is a square wave signal.

3. The apparatus for driving the light source of a projector as recited in claim 1, wherein the indication signal is initiated by a user of the projector.

4. The apparatus for driving the light source of a projector as recited in claim 1, wherein the adjustment unit further comprises:

a memory used for storing a formula regarding the frequencies of the enabling signal and the driving signal; and a controller used for regulating the frequency of the enabling signal by the formula and the indication signal.

5. The apparatus for driving the light source of a projector as recited in claim 1, further comprising:

a conversion unit used for receiving an original image signal, an original horizontal synchronization signal and an original vertical synchronization signal, converting the resolution and the frame rate of images to be displayed, and providing a converted image signal, a converted horizontal synchronization signal and a converted vertical synchronization signal, wherein the vertical synchronization signal is received by the PLL; and a display unit, displaying the image signal by the converted horizontal synchronization signal and the converted vertical synchronization signal.

6. The apparatus for driving the light source of a projector as recited in claim 1, further comprising:

a feedback unit, providing the indication signal according to the matching degree between the driving frequency of the mercury lamp and the frame rate of the projector so that the adjustment unit provides the enabling signal, according to the indication signal and the vertical synchronization signal, for matching the frequency of the synchronized driving signal with the frame rate of the projector.

7. The apparatus for driving the light source of a projector as recited in claim 6, wherein the frequency of the synchronized driving signal is the same as the frame rate of the projector.

8. The apparatus for driving the light source of a projector as recited in claim 6, wherein the frame rate of the projector is an integer multiple of the frequency of the synchronized driving signal.

9. The apparatus for driving the light source of a projector as recited in claim 6, wherein the feedback unit further comprises:

a light sensor used for providing an analog indication signal according to the matching degree between the driving frequency of the mercury lamp and the frame rate of the projector; and an analog-to-digital converter (ADC) for converting the analog indication signal into the indication signal.

10. A method for driving the light source of a projector, comprising the following steps:

providing an enabling signal and regulating a frequency of the enabling signal according to an indication signal;

providing a driving signal according to the enabling signal and an input voltage, wherein the frequency of the driving signal is varied with the frequency of the enabling signal;

providing a synchronized driving signal according to the driving signal and a vertical synchronization signal, wherein the synchronized driving signal is phase-synchronous with the frame fields of the projector; and driving a mercury lamp by the synchronized driving signal.

11. The method for driving the light source of a projector as recited in claim 10, wherein the enabling signal is a square wave signal.

12. The method for driving the light source of a projector as recited in claim 10, wherein the indication signal is initiated by a user of the projector.

13. The method for driving the light source of a projector as recited in claim 10, wherein the step for regulating the frequency of the enabling signal according to the indication signal further comprises:

providing a formula regarding the frequencies of the enabling signal and the driving signal; and regulating the frequency of the enabling signal according to the formula and the indication signal.

14. The method for driving the light source of a projector as recited in claim 10, further comprising:

providing the indication signal according to the matching degree between the driving frequency of the mercury lamp and the frame rate of the projector; and providing the enabling signal for matching the frequency of the synchronized driving signal with the frame rate of the projector according to the indication signal and the vertical synchronization signal.

15. The method for driving the light source of a projector as recited in claim 14, wherein the frequency of the synchronized driving signal is the same as the frame rate of the projector.

16. The method for driving the light source of a projector as recited in claim 14, wherein the frame rate of the projector is an integer multiple of the frequency of the synchronized driving signal.

* * * * *